United States Patent
Gromann et al.

(10) Patent No.: US 9,957,185 B2
(45) Date of Patent: May 1, 2018

(54) METHOD AND APPARATUS FOR PRODUCING A TUBE OF GLASS

(71) Applicant: Heraeus Quarzglas GmbH & Co. KG, Hanau (DE)

(72) Inventors: Boris Gromann, Aschaffenburg (DE); Matthias Söhn, Darmstadt (DE); Alexander Blumenau, Jena (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days. days.

(21) Appl. No.: 15/140,031

(22) Filed: Apr. 27, 2016

(65) Prior Publication Data

US 2016/0318789 A1    Nov. 3, 2016

(30) Foreign Application Priority Data

Apr. 28, 2015 (EP) .................................... 15165370

(51) Int. Cl.
   *C03B 23/08* (2006.01)
   *C03B 23/045* (2006.01)
   (Continued)

(52) U.S. Cl.
   CPC ............ *C03B 23/08* (2013.01); *C03B 23/043* (2013.01); *C03B 23/045* (2013.01); *C03B 23/053* (2013.01); *C03B 23/07* (2013.01)

(58) Field of Classification Search
   None
   See application file for complete search history.

(56) References Cited

U.S. PATENT DOCUMENTS 3,047,982 A * 8/1962 Olson ................... C03B 9/3841
   65/232
4,231,779 A * 11/1980 Barre ..................... C03B 9/145
   65/226
(Continued)

FOREIGN PATENT DOCUMENTS

DE     4121611 C1     12/1992
EP     0037648 A1     10/1981
(Continued)

OTHER PUBLICATIONS

Search Report dated Oct. 15, 2015 in EP Application No. 15165370.6.

*Primary Examiner* — Jodi C Franklin
(74) *Attorney, Agent, or Firm* — Panitch Schwarze Belisario & Nadel LLP

(57) ABSTRACT

A method and apparatus are provided for producing a tube of glass by zonewise heating and softening of a hollow cylinder by a movable heating zone while rotating about its rotation axis. The glass tube is continuously formed by radial expansion of the softened region under action of centrifugal force and/or internal overpressure applied in the hollow-cylinder bore. The method and apparatus make it possible to deform the hollow cylinder in a single or a small number of forming steps into a glass tube having a larger outer diameter and high dimensional accuracy by determining a circumferential position at which the wall thickness is comparatively small, and during heating and softening of the rotating hollow cylinder a coolant is dispensed from a coolant source onto the deformation zone only when or predominantly when the circumferential position having the comparatively small wall thickness passes the coolant source.

13 Claims, 3 Drawing Sheets

(51) Int. Cl.
*C03B 23/053* (2006.01)
*C03B 23/07* (2006.01)
*C03B 23/043* (2006.01)

(56) References Cited

U.S. PATENT DOCUMENTS

| | | | | |
|---|---|---|---|---|
| 4,278,459 | A | * | 7/1981 | Partus ............... C03B 37/01846 65/144 |
| 4,298,364 | A | * | 11/1981 | Blaszyk ................. C03B 23/07 65/110 |
| 4,312,653 | A | * | 1/1982 | Schneider ............. C03B 37/014 65/420 |
| 4,586,944 | A | * | 5/1986 | Romberg ............. C03B 9/1932 65/110 |
| 4,820,322 | A | * | 4/1989 | Baumgart ............. C03B 23/076 65/412 |
| 4,842,635 | A | * | 6/1989 | Spaapen ............. C03B 23/097 313/493 |
| 5,133,682 | A | * | 7/1992 | Gilligan ............. C03B 23/0496 445/26 |
| 5,167,420 | A | * | 12/1992 | Gregory ............. C03B 23/045 279/121 |
| 5,364,427 | A | * | 11/1994 | Fleming, Jr. ......... C03B 23/047 65/17.3 |
| 5,942,019 | A | * | 8/1999 | Saito ..................... C03B 23/043 65/382 |
| 5,961,680 | A | * | 10/1999 | Wooldridge ............. C03B 7/16 65/225 |
| 6,016,669 | A | * | 1/2000 | Correa ................. C03B 23/043 264/573 |
| 6,033,279 | A | * | 3/2000 | Van der Tempel ..... C03B 29/06 432/10 |
| 8,464,554 | B2 | * | 6/2013 | Fredholm ............... C03B 17/04 65/86 |
| 9,242,887 | B2 | * | 1/2016 | Gromann ............... C03B 5/0336 |
| 2003/0066313 | A1 | * | 4/2003 | Kerenyi ................ C03B 23/043 65/108 |
| 2005/0000250 | A1 | * | 1/2005 | Humbach ........... C03B 19/1423 65/413 |
| 2006/0150685 | A1 | * | 7/2006 | Fabian ................ C03B 37/01242 65/382 |
| 2006/0191294 | A1 | * | 8/2006 | Ganz ................... C03B 19/1453 65/404 |
| 2007/0271963 | A1 | * | 11/2007 | Lange .................... C03B 17/04 65/439 |
| 2009/0021135 | A1 | * | 1/2009 | Itaya ..................... C03B 23/045 313/493 |
| 2009/0324860 | A1 | * | 12/2009 | Riedl .................... C03B 23/049 428/34.4 |
| 2012/0042692 | A1 | * | 2/2012 | Fredholm ............... C03B 17/04 65/25.1 |
| 2013/0081430 | A1 | * | 4/2013 | Oozeki ............. C03B 37/01861 65/419 |
| 2013/0305784 | A1 | * | 11/2013 | Gromann ............. C03B 5/0336 65/29.14 |
| 2014/0102142 | A1 | * | 4/2014 | Dannoux ............. C03B 33/0855 65/25.1 |
| 2015/0225279 | A1 | * | 8/2015 | Bisson .................... C03B 40/04 428/34.4 |
| 2016/0168005 | A1 | * | 6/2016 | Gromann .................. C03C 3/06 65/109 |
| 2017/0015043 | A1 | * | 1/2017 | Shimizu ............... B29C 47/0026 |

FOREIGN PATENT DOCUMENTS

| | | |
|---|---|---|
| EP | 0522247 A1 | 1/1993 |
| JP | H10101353 A | 4/1998 |
| JP | 2004149325 A | 5/2004 |

* cited by examiner

METHOD AND APPARATUS FOR PRODUCING A TUBE OF GLASS

BACKGROUND OF THE INVENTION

Technical Field

The present invention relates to a method for producing a tube of glass, particularly of quartz glass, comprising the following method steps:
(a) providing a hollow cylinder of the glass having a wall thickness and having an outer diameter $D_1$,
(b) zonewise heating and softening the hollow cylinder which is rotating about a rotation axis in a heating zone moved relative to the rotation axis,
(c) forming a deformation zone by radial expansion of the softened area under the action of a centrifugal force and/or an internal overpressure applied in the hollow cylinder bore, and
(d) continuously forming the tube to produce an outer diameter $D_2$ which is greater than $D_1$.

Moreover, the present invention relates to an apparatus for performing such a method, comprising:
a rotation device for rotating a hollow cylinder of glass about its longitudinal axis, which cylinder has an inner diameter, an outer diameter $D_1$ and an inner bore defined by a wall, and
a heater which is movable relative to the hollow cylinder for the zonewise heating and softening of the hollow cylinder and for forming a tube having an outer diameter $D_2$ which is greater than $D_1$.

With the help of such methods and apparatuses, hollow cylinders of glass, particularly of quartz glass, are formed in one or several hot forming steps into tubes having an increased outer diameter. An initial hollow cylinder which is rotating about its longitudinal axis is here softened zone by zone in a heating zone, which is moved at a relative feed rate in relation to the hollow cylinder, and is expanded in this process under the action of a radially outwardly directed force either against a molding tool arranged at a given radial distance from the longitudinal axis of the tube, or it is formed without tools. The radially outwardly directed force is based on the centrifugal force and/or on an internal overpressure in the inner bore of the hollow cylinder (also called "blow pressure").

To observe the dimensional accuracy of the drawn-off tube strand, at least one of its dimensions, for example outer diameter, inner diameter, or wall thickness, is controlled. The blow pressure, the relative feed rate between hollow cylinder and heating zone, and the temperature in the heating zone are common manipulated variables of the control.

Prior Art

The larger the tube end diameter, the more difficult and expensive becomes the production of a dimensionally accurate large tube. To mitigate these problems, Japanese patent application publication JP 2004-149325 A suggests that the forming process should be subdivided into a plurality of forming steps with successive increase in diameter. To this end the hollow cylinder of quartz glass to be formed, having a diameter of 250 mm, is clamped in a lathe and rotated about its horizontally oriented longitudinal axis while being heated by an annular arrangement of heating burners and is thereby softened zone by zone, wherein the heating burners are moved at a given feed rate along the cylinder jacket. The increase in diameter is due to the centrifugal force acting on the softened region. The deformation zone will travel once along the entire initial cylinder until the cylinder is completely expanded. The outer diameter of the tube is here sensed continuously without tools by a laser beam. This forming step will be repeated until the nominal tube diameter of 440 mm is reached. In each forming step the tube diameter is increased by 15 mm.

In this forming process, one achieves a comparatively small forming degree in each individual forming step, which is accompanied by a reduced deviation from the target value of a radial tube dimension. Moreover, in each forming step it is possible to take into account and correct dimensional deviations existing in the respective initial cylinder.

On the other hand, it is evident that this procedure is very time- and energy-consuming, especially since the tube cools down between successive forming steps.

European patent application publication EP 0 037 648 A1 describes a method of producing optical fibers in which a tube is formed by zonewise heating and application of an internal overpressure into a tube having an increased inner diameter.

U.S. Pat. No. 5,167,420 describes an apparatus for producing a surrounding groove in a glass tube, wherein the viscosity of the glass is reduced in the area of the groove by active cooling.

Japanese patent application publication JP H10-101353 A describes a method for producing a quartz glass tube, wherein a quartz glass cylinder is softened zone by zone by applying an internal overpressure and is formed while rotating about its longitudinal axis against an outer molding tool into the tube. The quartz glass cylinder is here closed at one side. Besides the outer diameter, it is the aim to achieve a uniform wall thickness. To this end parallel mold plates are used on the molding tool.

German Patent DE 41 21 611 C1 describes a method for producing quartz glass tubes, in which the wall thickness of the drawn-off quartz-glass tube strand is regulated. A hollow cylinder of quartz glass is here pushed continuously while rotating through a heating furnace within which water-cooled graphite plates are arranged at a radial distance from the longitudinal axis of the tube. Due to overpressure within the hollow cylinder the soft hollow cylinder is blown against the graphite plates, so that the radial distance of the graphite plates from the longitudinal axis of the tube roughly predetermines the resulting outer diameter of the tube. Viewed in the feed direction of the blank relative to the furnace, soft quartz glass accumulates in front of the graphite plates and forms a circumferential bead around the outer wall of the blank. It is suggested that the height of the circumferential bead should be used for process control by optically sensing the bead height by a camera and by using the deviation from a predetermined target bead height for process control. The overpressure in the inner bore of the hollow cylinder is chosen as a manipulated variable of the control. Variations of the inner diameter of the tube and thus variations of the wall thickness of the tube can thereby be minimized.

Technical Object

It may be tried to keep the number of forming steps as small as possible, wherein the respective deformation degree, i.e. the change in diameter, is set to be as high as possible. However, it has been found that dimensional deviations already existing in the original hollow cylinder tend to continue into the drawn-off glass tube in the forming process and are even intensified. Variations in the radial cross-sectional profile or wall one-sidedness, i.e. radially irregular course of the tube wall thickness, which is also called "siding" among the experts, are particularly disadvantageously noticeable. Since the outer diameter is a relatively fixedly predetermined value in the use of a molding tool, tube wall siding is in this case accompanied by fluctuations in the inner diameter of the tube.

With increasing tube end diameter, these problems increase. The reason is that in the forming process wall thickness variations, which are found in the initial cylinder, exponentially rise with the diameter. Therefore, the maximum values for siding (e.g. 1 mm), which are still tolerable according to the specification, may in the final analysis limit the tube end diameter that can be realized in practice. Comparatively thin wall areas of the hollow cylinder deform more easily than rather thick-walled areas. The greater the blow pressure, the more the thickness difference will be noticed, so that the blow pressure cannot be arbitrarily high. Instead, in order to achieve commercially acceptable forming rates, the glass must be heated at a higher temperature and softened more strongly. This, however, results in pronounced drawing streaks and other defects in the glass wall and in an increased energy demand, especially in the case of large-volume tubes (hereinafter also called "large tubes"), which on account of their large size cool down particularly rapidly.

BRIEF SUMMARY OF THE INVENTION

It is thus an object of the present invention to provide a method which makes it possible to form a hollow cylinder in a single forming step or in a small number of forming steps, if possible, into a glass tube having a large outer diameter and high dimensional accuracy.

Moreover, it is the object of the present invention to provide an apparatus suited for performing the method.

As for the method this object, starting from a method of the type mentioned at the outset, is achieved according to the invention, wherein:

(i) providing the hollow cylinder according to method step (a) comprises the determination of a circumferential position at which the wall thickness is comparatively small, and (ii) during heating and softening of the rotating hollow cylinder a coolant is dispensed from a coolant source onto the deformation zone only when or predominantly when the circumferential position having the comparatively small wall thickness passes the coolant source.

In the method according to an embodiment of the invention at least one circumferential position is determined having a comparatively small wall thickness along the longitudinal axis of the hollow cylinder. The small wall thickness is for instance the minimal wall thickness in a radial cross-section around the circumference of the hollow cylinder. The circumferential position of the small wall thickness shall also be called "thin wall point" hereinafter, for short.

For the determination of the thin wall point in the sense of the above method step (i) the wall thickness profile around the circumference is determined directly or indirectly. With an indirect determination, for instance, the measurement of the inner diameter alone is enough when the outer diameter of the hollow cylinder can be assumed to be constant. This determination can be carried out in a separate measurement process in advance with respect to the forming process, or the determination is carried out successively during the forming process, but preferably before the length section of the hollow cylinder in question passes into the heating and deformation zone. The circumferential position of the thin wall point may shift, viewed over the length of the hollow cylinder to be formed. As a rule and in the simplest case, however, it is the same over the entire length of the hollow cylinder. Under this precondition the measurement of a hollow-cylinder ring is enough to be able to determine the circumferential position in question in the sense of the above method step (i) over the entire length of the hollow cylinder.

According to method step (ii) a coolant acts on the thin wall point as it passes into the area of the heating zone and thus into the deformation zone. The action of the coolant is periodic, i.e., it only happens if due to the rotation of the hollow cylinder the thin wall point passes a source, which is stationary in circumferential direction, for the discharge of coolant. The action may take place after each passage of the thin wall point or after a predetermined number of passages. With a controlled action the coolant is dispensed with a passage of the thin wall point in response to a cooling degree which is to be observed and is predetermined. At any rate, the discharge of coolant is changed in time more or less regularly in response to the clock frequency of the hollow-cylinder rotation, which will also be called "periodic coolant discharge" hereinafter.

The area of action to which the discharge of coolant is restricted can be regarded as a circular arc or circumferential section around the deformation zone. Coolant will be dispensed only if or predominantly when the circumferential section or circular arc is located in the coolant discharge area. When the thin wall point leaves that area, the discharge of coolant will be terminated or reduced. A maximally intensive cooling of a thin wall point as compared with the remaining wall point will be achieved if upon each rotation of the hollow cylinder about its longitudinal axis the coolant discharge is activated exactly once and then deactivated again completely.

Due to the action of the coolant the viscosity of the glass is locally increased around the thin wall point, whereby the deformability of the glass mass is reduced in this section of the deformation zone. The thin wall point is thus less strongly deformed; hence, it remains thicker than would be the case without the cooling locally acting thereon. Attention must here be paid that also a selective coolant discharge onto the thin wall point effects not only an increase in viscosity at exactly the circumferential position of the thinnest wall thickness, but also in neighboring areas—though to a lesser degree. The viscosity of the glass shows exponential temperature dependence, so that temperature variations of a few degrees already have a noticeable impact on viscosity.

Owing to the periodic coolant discharge, the viscosity of the glass mass rotating about the longitudinal axis of the hollow cylinder is influenced over the circumference of the deformation zone such that a more uniform preforming in the deformation zone is achieved independently of the wall thickness profile of the hollow cylinder. Even with a periodic coolant discharge, the discharge amount of coolant in each period and thus the intensity of the cooling action can be set selectively in response to a radial tube or hollow-cylinder dimension, and can be used specifically as a manipulated variable of a control for the tube or hollow-cylinder dimension in question. This dimension is particularly the wall thickness or the inner diameter.

"Deformation zone" is understood as that area in which the glass mass is plastically deformable and in which the geometry of the drawn-off tube can be influenced by cooling. In the deformation zone the outer diameter is continuously increasing from the hollow cylinder to the tube, and the wall thickness is normally decreasing, but it may also remain about the same.

The "beginning" of the deformation zone is defined as that x-position (along the longitudinal axis of the hollow cylinder) at which the following applies to the location-dependent outer diameter $D_V$ of the deformation zone: $D_{v1}=D_1+(1/10)\cdot(D_2-D_1)$. Likewise, the "end" of the deformation zone marks that x-position where the following applies to the location-dependent outer diameter $D_V$ of the deformation zone: $D_{v2}=D_2-(1/10)\cdot(D_2-D_1)$.

The method according to the invention reduces the unfavorable effect of existing wall one-sidedness of the hollow cylinder and thereby allows comparatively large diameter variations in one or each forming stage. This allows an economic forming process having few forming steps. Ideally, only one single forming step is required. Specifically, it is thereby possible to produce large tubes of quartz glass having outer diameters of more than 500 mm with acceptable energy expenditure and without pronounced drawing streaks and tolerable siding.

It has proven to be particularly advantageous when a liquid, particularly water, is used as the coolant.

Thermal energy is removed from the deformation zone during evaporation of the liquid. Preferably, water is used which is distinguished by a particularly high evaporation enthalpy and evaporates without residues from the surface of the deformation zone. In this respect the use of deionized water has proven to be particularly advantageous.

It has proven to be useful when the liquid is sprayed or splashed onto the deformation zone.

The spraying of the liquid in the form of fine droplets and the splashing in the form of a liquid jet allow a direct, locally defined application of the liquid, particularly of water. A small liquid amount is enough. It can be supplied rapidly as soon as the thin wall point enters the intended region of the coolant discharge, and it can be rapidly deactivated or reduced as soon as the thin wall point leaves again the intended region of the coolant discharge.

Preferably, the amount of liquid is changed in the cycle of the hollow-cylinder rotation.

The amount of cooling liquid dispensed by the coolant source varies in the cycle of the hollow-cylinder rotation; this means that it changes upon each rotation of the hollow cylinder at least twice. After the thin wall point has entered into the area of the coolant discharge, the coolant discharge is activated or increased, or it is deactivated or decreased as soon as the thin wall point leaves the intended area of the coolant discharge again.

For the compensation of a plurality of circumferentially distributed thin wall points, the coolant source can be activated several times during a rotation of the hollow cylinder. A particularly efficient cooling of a thin wall point as compared with the remaining wall circumference will however be achieved if the discharge of the coolant is activated exactly once and is deactivated completely exactly once during each rotation of the hollow cylinder about its longitudinal axis.

The shorter the circular arc around the deformation zone in which the coolant acts on it, the more efficiently can the viscosity be increased exactly in the area of the thin wall point. In this respect, it is provided in a preferred method embodiment that a circular arc around the deformation zone in which the coolant is operative is smaller than 30 angular degrees.

When high demands are made on dimensional accuracy and process stability, a procedure is preferred in which the internal pressure is set to less than 20 mbar, preferably to less than 10 mbar.

It has been found that a high internal pressure (blow pressure) can impair the process stability. The tangential tension which is operative in the tube wall due to the blow pressure depends on the wall thickness. The thinner the wall, the more noticeable is the internal pressure on the deformation in the deformation zone in tangential direction. This has the effect that wall thickness deviations existing in the hollow cylinder are intensified in the deformation zone under the action of blow pressure, because a thinner wall is subject to a higher tangential tension than a thicker wall.

With the formerly known forming methods, diameter changes $(D_2-D_1)$ of more than 40 mm were hardly possible without toleration of forming errors in the forming of hollow cylinders of quartz glass. Such diameter changes can be managed without any problems with the method according to embodiments of the invention. Even with diameter changes of 120 mm in a single forming stage, no inhomogeneities were observed in the drawn-off tube strand or instabilities in the process sequence.

Hence, in the method according to embodiments of the invention large diameter changes are preferred, so that the tube is produced having an outer diameter $D_2$ which is greater by at least 40 mm, preferably by at least 70 mm and particularly preferably by at least 100 mm than $D_1$.

It is thereby possible to set a diameter change of 40 mm or more in a single forming stage, preferably more than 70 mm and particularly preferably more than 100 mm, so that a particularly economic forming method having a few forming steps is also possible in the case of large diameter changes. Ideally, only one single forming step is required. It is thereby particularly possible to produce large tubes of quartz glass having outer diameters of more than 500 mm with acceptable energy expenditure and without pronounced drawing streaks and tolerable siding.

It is intended in a particularly preferred method embodiment that the temperature profile around the circumference of the deformation zone be determined.

The coolant periodically acting on the thin wall point locally cools the surface in the area of the deformation zone. By measurement of the surface temperature around the circumference of the deformation zone one obtains information about the degree of cooling in relation to the level and the local distribution of the temperature. The cooling measure can be adapted or controlled on the basis of this temperature measurement in that cooling is stopped or reduced, for instance when a limit temperature is not reached. Comparative data determined by simulation or empirically may additionally be taken into account in the adaptation/control. In the area of the cooled point one achieves maximum cooling and temperature difference. Starting therefrom, a certain flattening of the temperature distribution is observed during each rotation. For the detection of the circumferential temperature profile one or more temperature measurement points are distributed around the circumference of the deformation zone in the area of the longitudinal axis position of the coolant action. A single measurement point is enough in the simplest case due to the rotation of the deformation zone. Suitable circumferential positions for a temperature measurement point are, for instance, located opposite to the position of the coolant action (after a rotation of the cooled point by about 180 degrees) or directly in front of this position (after a rotation between 300 degrees to 360 degrees). Suitable measuring devices are, e.g., infrared cameras or pyrometers.

As for the apparatus the above-indicated object, starting from an apparatus of the type mentioned at the outset, is achieved according to the invention in that a coolant source is arranged around a deformation zone to dispense a coolant periodically to the deformation zone as soon as, due to the hollow-cylinder rotation, a circumferential position having a comparatively small wall thickness passes the coolant source.

The apparatus according to embodiments of the invention is intended to expand (inflate) at least one circumferential position having a comparatively small wall thickness along the longitudinal axis of the hollow cylinder, also shortly called "thin wall point," into the tube to a smaller degree than neighboring wall portions. For this purpose, it is intended that a coolant acts on one or several previously determined thin wall points, when this point passes into the deformation zone and its further deformation can be influenced by the action of a coolant.

For this purpose, the apparatus according to embodiments of the invention is provided with a circumferentially preferably stationary source for the discharge of coolant that is passed by the thin wall point periodically due to the rotation of the hollow cylinder. The coolant source is connected to a control device and is preferably configured such that it dispenses coolant exactly once to the deformation zone during each passage of the thin wall point during an action period. The coolant amount applied during the action period depends on the degree of the wall thickness deviation to be corrected and is empirically determined and iteratively adapted in the simplest case. The action period is typically within the range of a few seconds. It may be predetermined by the control device that with specific passages of the thin wall point no coolant or a smaller amount of coolant is dispensed to the deformation zone.

In a preferred embodiment of the apparatus according to the invention the coolant source is configured to dispense a liquid coolant.

It comprises for instance a nozzle, a tube or an atomizer and is adapted to transport the cooling liquid in the form of a jet, or as fine droplets having a diameter of less than 1 mm, to the intended action area of the deformation zone. When water, e.g., is used as a cooling liquid, it must be assumed, because of the comparatively low boiling point and the high temperatures in the deformation area, that hardly any or little liquid, but at best vapor, passes onto the surface itself, wherein, however, heat is removed due to the evaporation from the surroundings around the (theoretical) impact point and the impact point is thereby cooled.

The coolant source is preferably movable together with the heater or a molding tool in the direction of the longitudinal axis of the hollow cylinder, but is stationary in circumferential direction. The action of the coolant is restricted to a circumferential section or to a circular arc around the deformation zone. The shorter this circular arc, the more accurately the coolant dispensed by the coolant source acts only on the thin wall point. In this respect, the circular arc around the deformation zone in which the coolant is operative is preferably less than 30 angular degrees.

It has also proven to be useful when the coolant source is connected to a control device for the inner diameter, the outer diameter or the wall thickness of the wall of the tube and is configured to dispense a given coolant amount in response to a control signal of the control device.

This embodiment is particularly also suited for the compensation of several thin wall points distributed around the circumference, in that the coolant source can be activated by the control device during a hollow-cylinder rotation repeatedly for the discharge of coolant.

To be able to determine the temperature profile around the circumference of the deformation zone, one or several temperature measuring devices are distributed in a particularly preferred embodiment of the apparatus around the circumference of the deformation zone in the area of the longitudinal axis position of the coolant action. Suitable measuring devices are, for instance, infrared cameras or pyrometers.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3 is an enlarged schematic representation view of the wall thickness profile of the hollow cylinder in the area of the deformation zone at the time when a coolant supply is switched on;

DETAILED DESCRIPTION OF THE INVENTION

Figure 1:
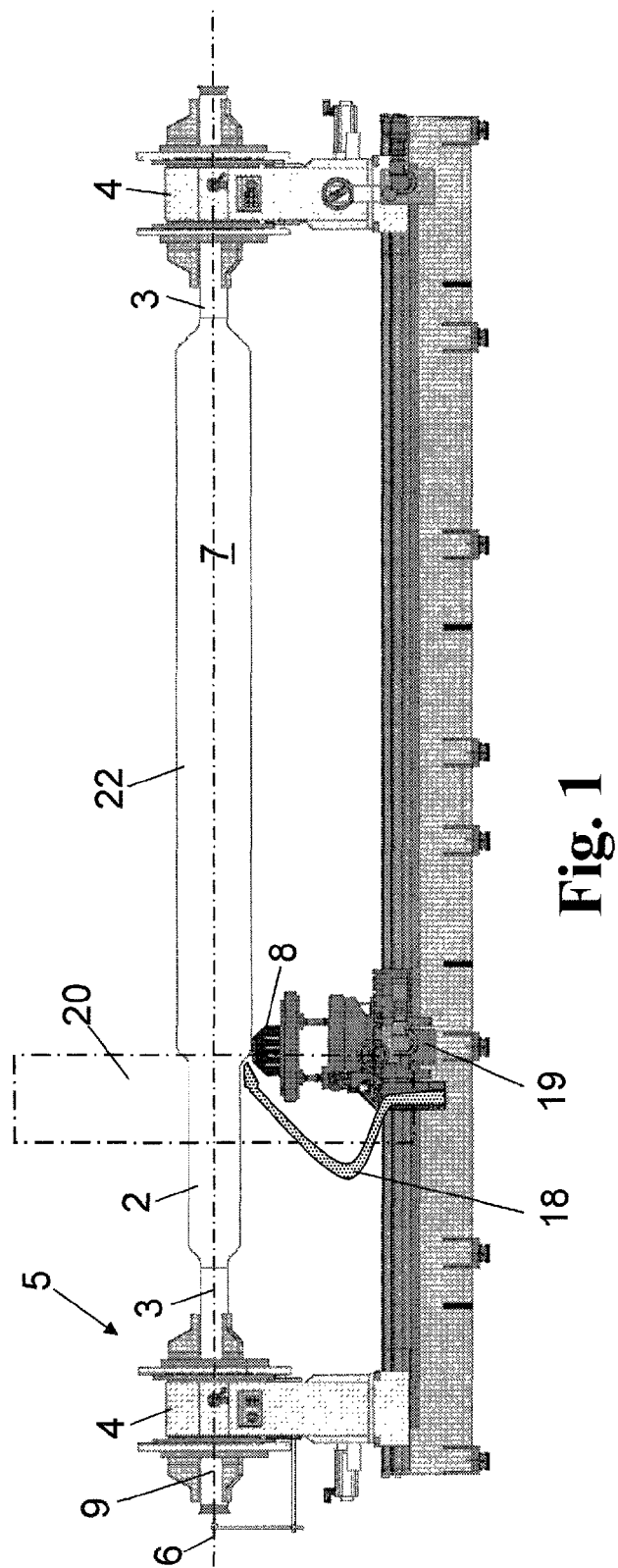
FIG. 1 is a schematic, side view representation of an embodiment of an apparatus according to the invention for forming a hollow cylinder of quartz glass into a quartz glass tube.

FIG. 1 schematically shows an apparatus for forming a hollow cylinder 2 of quartz glass into a larger tube 22. The forming process comprises several forming stages in which the respective initial hollow cylinder is formed, starting from an outer diameter of 300 mm, successively into the desired larger tube 22 having an outer diameter of 960 mm and a wall thickness of 7.5 mm.

Holding tubes 3 are welded onto the ends of the hollow cylinder 2 of quartz glass which is to be formed. The holding tubes 3 are clamped in chucks 4 of a horizontal glass lathe 5, which are synchronously rotating about the rotation axis 6. A burner carriage 21 (see FIG. 2), on which a plurality of burners are distributed in ring form around the outer circumference of the hollow cylinder 2, is moved from one hollow-cylinder end to the other end, thereby heating the hollow cylinder 2 of quartz glass zone by zone and around its entire circumference. The burner carriage 21 is symbolized in FIG. 1 by a dash-dotted circumferential line 20, which corresponds to the heating zone; it is schematically shown in detail in FIG. 2. Via a gas inlet 9, the inner bore 7 of hollow cylinder 2 and larger tube 22 can be flushed with gas, and a defined internal pressure can be set. Driven by the centrifugal force and the internal pressure, the outer tube wall comes to rest on a molding of graphite 8, which is moved together with the burner carriage 21.

The graphite molding 8 is mounted on a slide 19 which is movable along the longitudinal axis 6. Moreover, a water jet tube 18 which is directed onto the deformation zone 14 between hollow cylinder 2 and tube 22 is mounted on the slide 19. The water jet tube 18 periodically produces a fine water jet having a diameter of less than 5 mm. The water jet can impinge in liquid form or in vapor form on the deformation zone 14.

Figure 2:
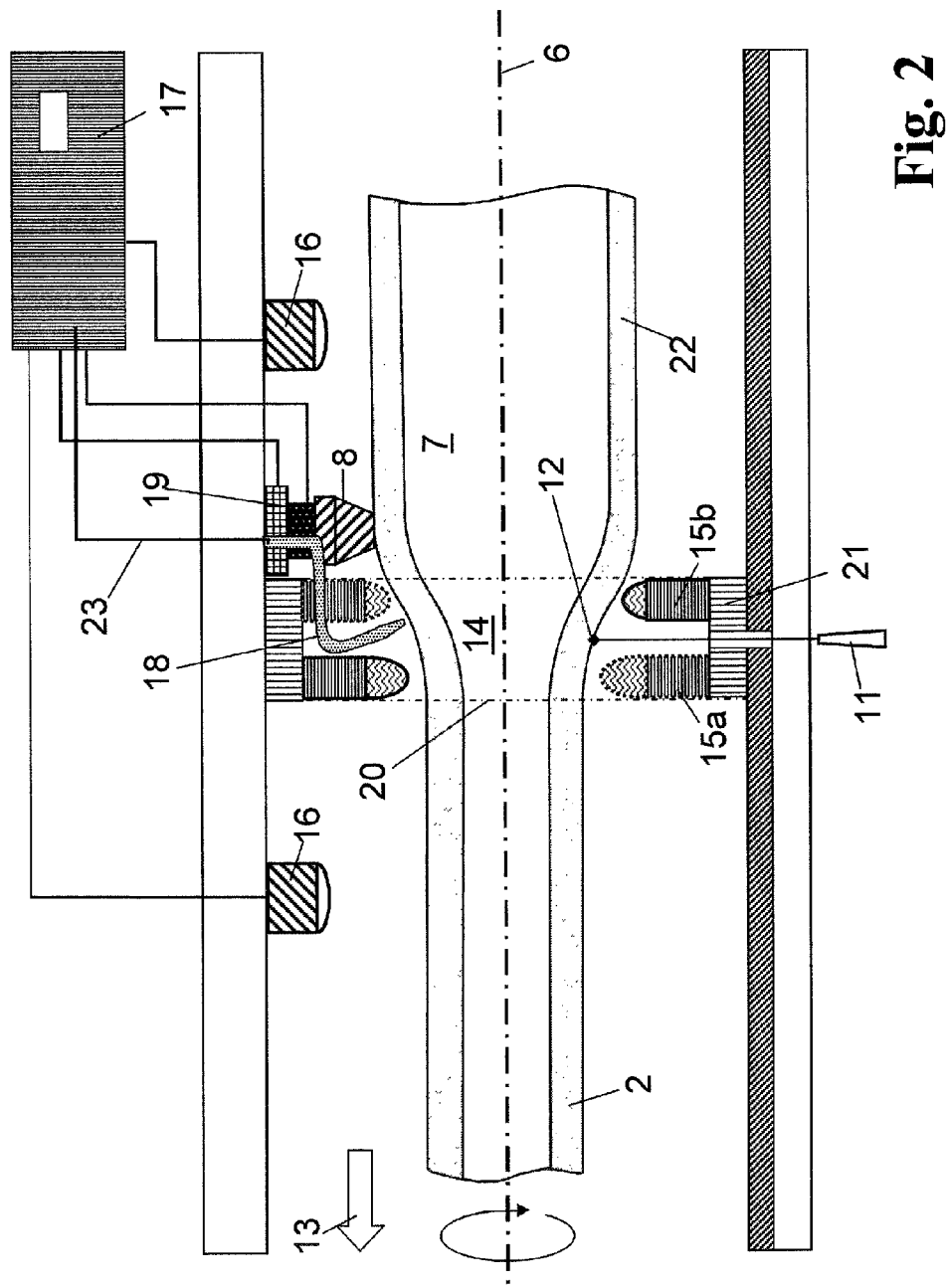
FIG. 2 is a schematic, sectional representation of the apparatus of FIG. 1 showing additional constructional details.

The detail view of FIG. 2 shows the slide 19 with the water jet tube 18 mounted thereon and the deformation zone 14 between hollow cylinder 2 and tube 22. The water jet tube 18 is connected via a data and control line 23 to a control device 17.

The burner carriage 21 moves along the initial hollow cylinder 2 from the right side to the left side, as shown by the directional arrow 13. The burner carriage 21 has mounted thereon in successive order two burner rings 15*a*, 15*b* that are running in parallel around the rotation axis 6 and serve to heat and soften the initial cylinder 2. The two burner rings 15*a*, 15*b* are spaced apart in axial direction 6 by 50 mm and are adjustable in their heating capacity independently of each other. Each of the burner rings 15*a*, 15*b* is formed of five gas burners that are evenly distributed around the longitudinal axis 6 of the cylinder, wherein, viewed in circumferential direction, the individual burners of the burner rows 15*a*, 15*b* are arranged offset from one another.

Due to the advance movement of the burner carriage 21 at a speed of 4 cm/min, the hollow cylinder 2 while rotating about its longitudinal axis 6 (which corresponds to the rotation axis) is heated continuously under the action of the burner rings 15*a*, 15*b* to a high temperature of about 2100° C. A lower heating capacity is here set in the rear burner ring 15*b* in comparison with the front burner ring 15*a*.

The inner bore 7 may here be flushed with a gas, and a defined and controlled internal pressure of up to about 100 mbar can be set in the inner bore 7. A blow pressure of 15 mbar is applied in the embodiment.

The quartz glass is given such a low viscosity by the heating in the burner rings 15*a*, 15*b* that it deforms solely under the action of centrifugal force and internal pressure and without use of a molding tool into the tube 22. The forming process is thus without tools. As a support, the outer tube wall comes to rest on a molding 8 of graphite.

To measure the wall thickness, optical sensors 16 which are connected to a control device 17, including a wall thickness control, are arranged in the area of the initial cylinder 2 and in the area of the drawn-off quartz glass tube 22. The sensors 16 are able to continuously produce a wall thickness profile, while the tube strand is rotating, which profile is evaluated in the control device 17 such that the amount of wall one-sidedness (maximum value minus minimum value of the wall thickness) and the circumferential position of the minimum wall thickness (thin wall point) and the maximum wall thickness over the outer circumference are detected.

To measure the surface temperature in the area of the deformation zone 14, a pyrometer 11 is directed onto a measurement point 12. The position of the temperature measurement point 12 is positioned opposite to the imaginary impact point for the water jet from the water jet tube 18 onto the deformation zone 14 (having an offset of about 180 degrees in rotation direction). The temperature profile around the circumference of the deformation zone 14 is thereby detected. This information is supplied via a data and control line (not shown) to the control device 17 and used in addition to the temperature or wall thickness control.

Figure 4:
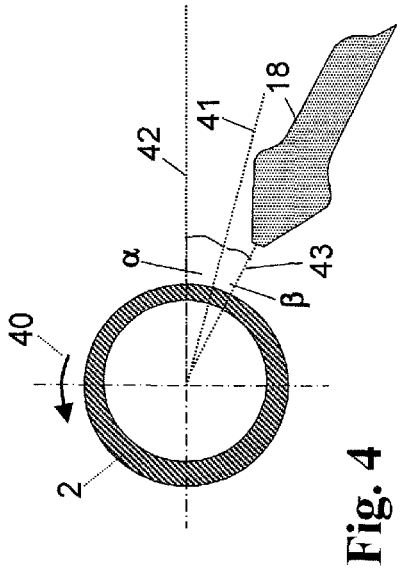
FIG. 4 is a view similar to FIG. 3 of the wall thickness profile in the area of the deformation at the time when the coolant supply is switched off.
Figure 3:
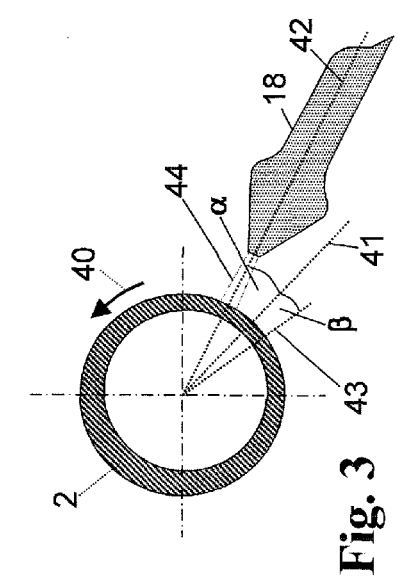

FIG. 3 schematically shows the wall thickness profile of the hollow cylinder 2 in the area of the deformation zone 14 in a radial cross-section. The rotation direction around the longitudinal axis 6 is designated by the arrow 40, and the previously determined circumferential position of the thinnest hollow-cylinder wall is designated with the reference numeral 41. The control device 17 controls the water supply via the water jet tube 18, such that a water jet 44 is splashed briefly during passage of the previously determined thin wall point 41. The cooling water supply already sets in shortly before the thin wall point 41 reaches the circumferential position of the water jet tube 18, and it ends shortly after the thin wall point 41 has passed the circumferential position of the water jet tube 18, as shown in FIG. 4.

In this embodiment, the angle α between the circumferential position 42 with incipient water jet 44 and thinnest wall point 41 is about 10 degrees, and the angle β between the circumferential position 43, starting from which the water jet 44 is again switched off, and the thinnest wall point 41 is about 5 degrees. In response to the hollow-cylinder rotation, one thereby obtains a "pulsating" cooling-water discharge onto the deformation zone 14 via a circular arc of about 15 degrees, which surrounds the thinnest wall point 41. The discharge of cooling water is only carried out when the thinnest wall point 41 is positioned within this circular arc. When the thinnest wall point 41 leaves the circular arc, the discharge of cooling water is terminated.

The viscosity of the quartz glass around the thinnest wall point 41 is thereby locally increased, and the deformability of the glass mass is thereby reduced in this section of the deformation zone. The thinnest wall point 41 remains thicker than would be the case without the cooling locally acting on it. Since the viscosity of the quartz glass shows exponential temperature dependence, temperature variations of a few degrees already have a noticeable effect on the viscosity.

When the hollow cylinder 2 is rotating with the initial outer diameter of 300 mm about the longitudinal axis 6 at a rotation speed of 30 rpm, this leads in the area of the deformation zone 14 (depending on the local circumference) to a tangential speed of more than 0.5 m/s. A quartz glass strip having a width of 1 cm and a wall thickness of 1 cm thus shows a mass velocity of about 0.11 kg/s. To cool this strip by 1 K, an energy conversion of about 150 J/s must be discharged (at a specific thermal capacity of quartz glass of about 1.4 J/gK), which corresponds to a water amount of 0.06 g/s (on the assumption that the entire water amount evaporates).

Due to the pulsating periodic cooling-water discharge, the viscosity of the glass mass, which is rotating about the longitudinal axis 6 of the hollow cylinder, is influenced over the circumference of the deformation zone 14 such that, independently of the wall thickness profile of the hollow cylinder, one achieves a more uniform preforming in the deformation zone.

Figure 5:
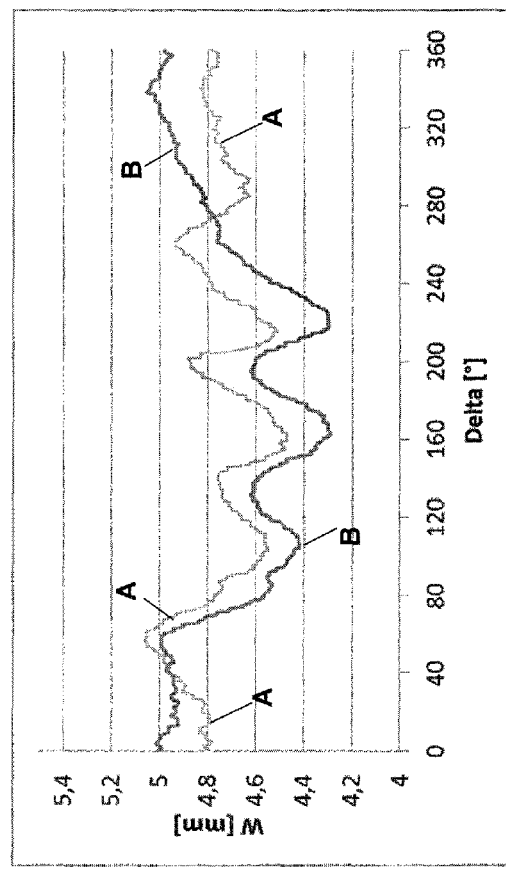
FIG. 5 is a graphical diagram for explaining the influence of the coolant supply on the wall thickness profile during a forming process.

In the case of several forming stages for producing the final tube diameter, it is enough when the wall thickness correction is carried out by periodic cooling-water discharge in the last forming stage. This is also demonstrated by the diagram of FIG. 5, which shows the wall thickness profile of neighboring length sections of a quartz glass tube after the last forming stage (outer diameter of the initial cylinder 2=320 mm, outer diameter of the final tube 22=440 mm, nominal wall thickness 4.7 mm). In the diagram, the wall thickness W is plotted (in mm) against the circumferential angle delta (in degrees). The initial cylinder 2 shows a thin wall point which extends with a uniform pattern and at the same circumferential position (in FIG. 5 at about 160 degrees) over its entire length. During the forming of the one length section of the tube (curve A), the thin wall point was treated on the basis of a periodic cooling-water discharge according to the invention. By comparison with the non-treated length section (curve B), the degree of wall one-sidedness (siding), calculated as a maximum wall thickness minus minimum wall thickness, could be reduced from 0.76 mm to 0.59 mm by use of the cooling-water measure in the last forming stage alone.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a tube of glass comprising the following method steps:
   (a) providing a hollow cylinder of the glass having a bore defined by a wall, a wall thickness, and an initial outer wall diameter $D_1$;
   (b) heating and softening the hollow cylinder in a zone-wise manner while the hollow cylinder is rotating about a rotation axis of the hollow cylinder and a heating zone is moved axially relative to the rotation axis;
   (c) forming a deformation zone by radial expansion of a softened area of the hollow cylinder under action of at least one of centrifugal force and internal overpressure applied in the hollow cylinder bore; and
   (d) continuously deforming the hollow cylinder to a tube having a second outer diameter $D_2$ which is greater than initial diameter $D_1$,
   wherein step (a) includes a step of determining a circumferential position at which the wall thickness is minimal around a circumference of the hollow cylinder, and
   wherein during heating and softening of the rotating hollow cylinder, a coolant is dispensed from a coolant source onto the deformation zone only when or predominantly when the circumferential position having the minimal wall thickness passes the coolant source.

2. The method according to claim 1, wherein a liquid is used as the coolant.

3. The method according to claim 2, wherein the liquid is sprayed or splashed onto the deformation zone.

4. The method according to claim 2, wherein the liquid comprises water.

5. The method according to claim 2, wherein the liquid is changed in amount during a cycle of the hollow-cylinder rotation.

6. The method according to claim 5, wherein the liquid amount during each rotation of the hollow cylinder about its longitudinal axis is increased exactly once and is decreased exactly once.

7. The method according to claim 1, wherein a circular arc around the deformation zone in which the coolant is operative is smaller than 30 angular degrees.

8. The method according to claim 1, wherein the internal overpressure is set to less than 20 mbar.

9. The method according to claim 1, wherein the produced tube has an outer diameter $D_2$ which is greater than the initial diameter $D_1$ by at least 40 mm.

10. The method according to claim 1, further comprising a step of determining a temperature profile around a circumference of the deformation zone.

11. The method according to claim 1, wherein the internal overpressure is set to less than 10 mbar.

12. The method according to claim 1, wherein the outer diameter $D_2$ of the produced tube is greater than the initial diameter $D_1$ by at least 70 mm.

13. The method according to claim 1, wherein the outer diameter $D_2$ of the produced tube is greater than the initial diameter $D_1$ by at least 100 mm.

* * * * *